United States Patent
Bussmann et al.

(10) Patent No.: US 11,925,187 B2
(45) Date of Patent: Mar. 12, 2024

(54) METHOD FOR ADJUSTING THE DRY MATTER CONTENT OF CONCENTRATES IN CURD PRODUCTION AND DEVICE FOR CARRYING OUT THE METHOD

(71) Applicant: GEA WESTFALIA SEPARATOR GROUP GMBH, Oelde (DE)

(72) Inventors: Daniel Bussmann, Oelde (DE); Lennart Beick, Bielefeld (DE); Thomas Veer, Beesten (DE); Kai Wittelmann, Oelde (DE)

(73) Assignee: GEA Westfalia Separator Group GmbH, Oelde (DE)

( * ) Notice: Subject to any disclaimer, the term of this patent is extended or adjusted under 35 U.S.C. 154(b) by 0 days.

(21) Appl. No.: 17/708,364

(22) Filed: Mar. 30, 2022

(65) Prior Publication Data
US 2022/0312786 A1 Oct. 6, 2022

(30) Foreign Application Priority Data
Mar. 31, 2021 (DE) ...................... 10 2021 108 269.2

(51) Int. Cl.
*A23C 19/024* (2006.01)
*A01J 25/00* (2006.01)
(Continued)

(52) U.S. Cl.
CPC ........... *A23C 19/024* (2013.01); *A01J 25/007* (2013.01); *A01J 25/111* (2013.01); *A23C 19/05* (2013.01); *A23C 19/076* (2013.01)

(58) Field of Classification Search
CPC ........ A01J 25/11; A01J 25/111; A23C 19/024
See application file for complete search history.

(56) References Cited

U.S. PATENT DOCUMENTS 3,983,257 A * 9/1976 Malmberg ........... A23C 9/1508
426/491
2019/0239525 A1* 8/2019 Nagaoka ................. A23C 9/12

FOREIGN PATENT DOCUMENTS

DE 3238462 A1 4/1984
DE 277583 A3 4/1990
(Continued)

OTHER PUBLICATIONS

Search Report created Nov. 4, 2021 in related/corresponding DE Application No. 10 2021 108 269.2.

*Primary Examiner* — Changqing Li
(74) *Attorney, Agent, or Firm* — PATENT PORTFOLIO BUILDERS PLLC

(57) ABSTRACT

Dry matter content in curd is adjusted by feeding starting product into a nozzle separator while determining a content of dry matter and/or protein, and measuring mass flow of the starting product. The nozzle separator separates the starting product into whey and curd fractions, which are separately discharged from the separator and the mass flow of the whey fraction is measured. Mass flow rate of supplied starting product is adjust based on the determined content of dry matter or protein of the starting product, measure mass flow of the starting product, and measured mass flow of the whey fraction. A determination of the dry matter content and/or the protein content of the curd fraction is carried out based on the determined mass flow of the starting product and the mass flow of the whey fraction and the determined dry matter content and/or protein content of the starting product.

7 Claims, 2 Drawing Sheets

Figure 1:
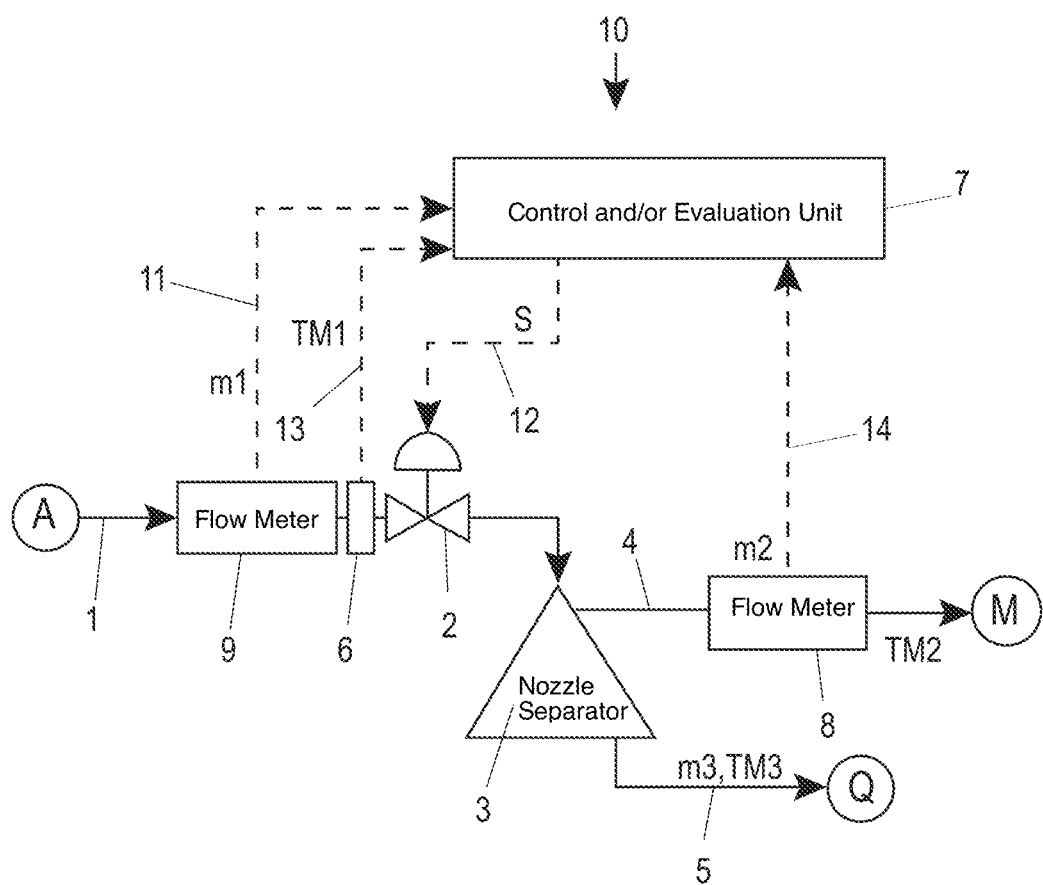

(51) Int. Cl.
*A01J 25/11* (2006.01)
*A23C 19/05* (2006.01)
*A23C 19/076* (2006.01)

(56) References Cited

FOREIGN PATENT DOCUMENTS

| | | |
|---|---|---|
| DE | 102004035215 A1 | 2/2006 |
| EP | 0440208 A1 | 8/1991 |
| EP | 0440208 B1 | 7/1993 |

\* cited by examiner

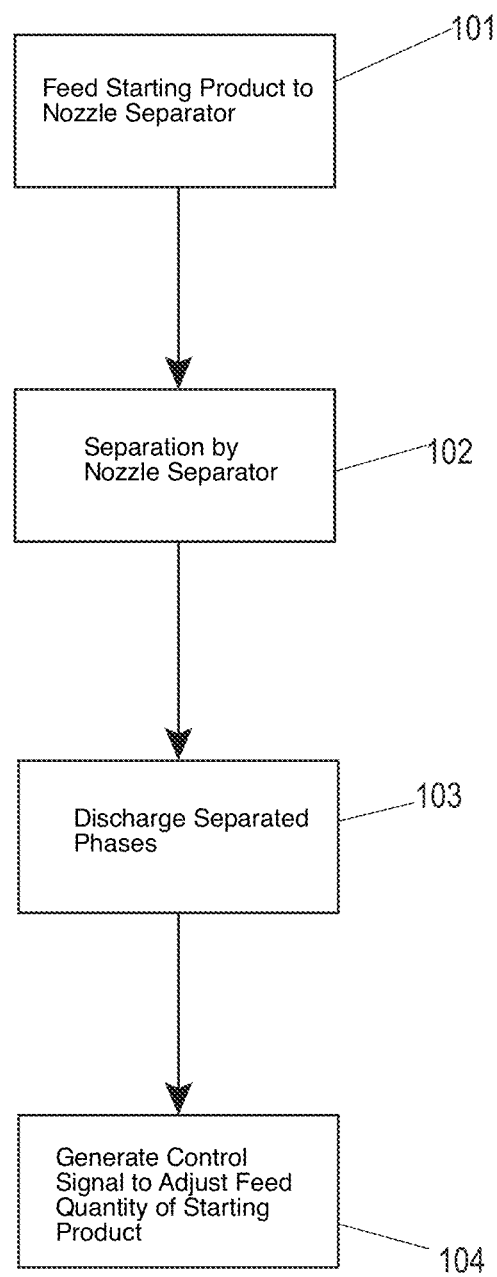

METHOD FOR ADJUSTING THE DRY MATTER CONTENT OF CONCENTRATES IN CURD PRODUCTION AND DEVICE FOR CARRYING OUT THE METHOD

BACKGROUND AND SUMMARY OF THE INVENTION

Exemplary embodiments of the present invention relate to a method for adjusting the dry matter content of concentrates in curd production, and to a correspondingly equipped device comprising a nozzle separator.

DE 10 2004 035 215 A1 describes a method in which a constant feed quantity is specified. If a fluctuation in the dry matter content of the curd is determined by random measurements, the feed quantity is adjusted manually.

Furthermore, a method for controlling the production of curd cheese with a heavy cream stage is known from EP 0 440 208 B1. Here, a measurement is made at the whey discharge. Unlike in curd production, however, the whey is the heavy phase in curd cheese. Therefore, the mass flow of the heavy phase is also determined here. The dry matter is also determined by measuring the heavy phase, which in this case is the whey and in the case of curd production corresponds to the curd fraction.

DE 32 38 462 A1 discloses measuring the quantity of cream produced per unit of time and adjusting the feed rate accordingly.

DD 2 77 583 A3 discloses a dry matter determination by measuring the conductance. A calculation unit is used to determine the dry mass content on the basis of a conductance of the quark downstream of a quark funnel. The problem is that a change in the feed quantity has a high dead time until detection. The dry matter feed is measured in the laboratory and is assumed to be constant. Furthermore, the conductivity measurement is dependent on the pH value and the fat content of the medium to be determined. Therefore, these values must be known or additionally determined.

A generic method for adjusting the dry matter content of curd cheese, in particular curd, is also known from DE 10 2004 035 215 A1. This method is based on pressure measurement, with a corresponding pressure sensor or measuring sensor being arranged in the heavy phase discharge upstream of a cooling device. The pressure measurement is used as a controlled variable for setting a feed rate of the initial product into the separator.

The difference between cream cheese and curd is well known. Basically, curd is a special form of cream cheese. For this application, the difference can be reduced to the fact that in the centrifugation of curd, the whey is the light phase. In contrast, in the centrifugation of cream cheese, the whey is the heavy phase. This can be explained quite generally by the different fat content of the other phase.

The dry matter (hereinafter DM) of the curd produced is largely dependent on the DM of the tank milk, the whey, the nozzle equipment of the separator, and the feed quantity to the separator. The rule of thumb is that a larger feed volume results in a higher DM of the curd.

Checking the dry matter of the milk and whey as well as measuring the dry matter of the curd is usually done by sampling and analysis using the rapid method, as already introduced as the prior art in DE 10 2004 035 215 A1. The analysis of the DM content in these samples has a tolerance of at least ±0.1%.

By determining the dry matter only in the end product (curd concentrate), however, it is only possible to intervene in the process with a delay. This results in an undesired deviation in the end product before countermeasures can be taken by changing the feed quantity. In addition, a dead time for the concentration of the product in the separator bowl must be taken into account in the regulating system, and the regulator must be set slowly accordingly. In a test carried out for this purpose, the time delay of the regulating system was about 3 minutes.

Based on the aforementioned problem, exemplary embodiments of the present invention provide a method permitting faster and thus more accurate adjustment of the dry content in curd production.

A method according to the invention for adjusting the dry matter content in curd is carried out by means of a device for centrifugal separation of a starting material into curd and whey. The core component of the device is a nozzle separator. The device may further include, for example, feed and discharge lines, as well as one or more measuring devices, regulating elements and/or a control and/or evaluation unit.

The method according to the invention has at least the following steps:

a. A feed line with determination of a content of dry matter and/or protein and determination, in particular measurement, of the mass flow of the starting product;

A skim milk, for example, can be used as the starting product. The dry matter and/or protein content of the starting product can be determined, for example, by microwave measurement or infrared measurement, in particular NIR measurement (near infrared measurement). Corresponding inline measuring devices are known that take a measurement directly in a feed line or in a bypass pipe of the feed line without separate sampling. A determination by sampling is also possible, but less preferred.

b. Centrifugal separation of the starting material through the nozzle separator into a whey fraction and a curd fraction;

A nozzle separator is used for centrifugal separation. While a number of applications prefer a two-phase separator, in the present application a nozzle separator has proven to be much more efficient.

c. Separate discharge of the whey fraction and the curd fraction from the nozzle separator and determination, in particular measurement, of the mass flow of the whey fraction;

The mass flow of the whey fraction is then determined to establish a mass balance in the course of adjusting the dry matter content of the curd. It is assumed that, with appropriate separating efficiency of the separator, the dry matter content of the whey is approximately constant, regardless of how much the DM content of the starting product fluctuates. The same applies to the protein content.

d. Adjusting the mass flow rate of starting product as a function of the values determined in steps a) and c).

Finally, the mass flow of the fed starting product is adjusted as a function of the determined mass flows and the DM content or protein content of the starting product.

The dependence consists in particular in the fact that the mass flows determined in step a) to c) serve as controlled variables for setting the mass flow in step d), for example, by adjusting the opening cross section of a feed valve of the device according to the invention. However, variables derived from the mass flow can also be used as controlled variables. This can be calculated, for example, from mass flow in the case of known physical variables of the medium and/or the device according to the invention, such as, for example, the density and/or the temperature and/or the pipe cross-section, also the volume flow rate, the flow velocity, and other process variables. The skilled person is aware of the dependencies of these measured variables, and can also consider, to determine various control values derived from the mass flows.

According to the invention, a determination of the dry mass content or the protein content of the curd fraction is carried out based on the determined mass flow of the starting product and the mass flow of the whey fraction and the determined dry mass content or protein content of the starting product.

The process according to the invention achieves, in particular, a minimization of the dead time, with more precise control as close as possible to desired specifications, for example legal specifications or manufacturer specifications.

For a display and manual monitoring of the process parameters, it is advantageous if a determination of the mass flow of the curd fraction is carried out based on the determined mass flow of the starting product and the mass flow of the whey fraction.

For the same reason, it is advantageous if a determination of the dry matter content or the protein content of the curd fraction is made based on the determined mass flow of the starting product and the mass flow of the whey fraction and the determined dry matter content or protein content of the starting product.

In order to ensure a fluctuation-free determination of a nozzle discharge, it is advantageous if this is carried out with smoothing of the temporal course of the determined values of the nozzle discharge over a period of at least 20 seconds, preferably 30-90 seconds. The nozzle discharge corresponds, in particular, to the discharge of the heavy phase from the nozzle separator.

The time difference between the measurement of the dry matter content or protein content in step a) and an adjustment of the feed quantity in step d) is advantageously less than 2 minutes. This enables a more precise adjustment of the dry matter or protein content and starting products with strongly varying compositions can be processed well.

It is advantageous if the mass flows of the starting product fed into the nozzle separator and of the whey fraction discharged are determined, preferably continuously, as controlled variables and the mass flow in the discharge line of the curd fraction is calculated from this. This determined mass flow in the discharge line can be used as a value for determining a manipulated variable for automatic, and preferably continuous, regulation of the feed quantity of the starting product. This regulation is typically performed by a regulating valve. However, all other devices for setting a feed quantity are also conceivable.

Advantageously, the starting product is continuously fed to the nozzle separator during curd production and whey and curd are continuously discharged. Process interruptions for the analysis of random samples can be advantageously omitted.

Also, the determination of the dry matter content can be done continuously.

Also advantageous is a device for the production of curd comprising a nozzle separator and a control and/or evaluation unit equipped to carry out the method according to the invention. In particular, it has corresponding control electronics and a control software product, mounted on a memory unit.

In particular, the device may have a feed line for feeding starting product into the nozzle separator, and a first discharge line for discharging whey from the nozzle separator and a second discharge line for discharging curd from the nozzle separator.

The mass flow rate of the whey can be determined by a flow meter, in particular a Coriolis flow meter, wherein at least one measuring sensor of the meter is arranged in or along the first discharge line. This measurement is independent of fluctuating values in pH or fat content.

The mass flow of the starting product can advantageously be determined by a mass flow meter, in particular a Coriolis flow meter, wherein at least one measuring sensor of the meter is arranged in or along the feed line.

The dry matter content and/or the protein content can be determined by a measuring device with a measuring sensor for emitting and/or receiving electromagnetic radiation, in particular by a microwave measurement or an infrared measurement, in particular NIR measurement, wherein at least the measuring sensor of the measuring device is arranged in or along the feed line.

Furthermore, the device can have a regulating element, in particular a regulating valve, for adjusting the feed quantity and/or the mass flow of the starting product, which is arranged along the feed line.

The present process thus continuously measures the product quality and likewise continuously adjusts the dry mass content of the curd via the feed.

BRIEF DESCRIPTION OF THE DRAWING FIGURES

Further advantages, features and details of the invention will be apparent from the following description, in which an exemplary embodiment of the invention is explained in more detail with reference to the accompanying drawings. The person skilled in the art will expediently also consider the features disclosed in combination in the drawing, the description and the claims individually and combine them to form useful further combinations. In particular, there are a multitude of possibilities for modifying and further developing the method for adjusting the dry matter content according to the invention within the scope of the present invention, wherein:

FIG. 1 shows a schematic illustration of a device with a nozzle separator for carrying out the method according to the invention; and FIG. 2 shows a block diagram of the process sequence of the method according to the invention.

DETAILED DESCRIPTION

The dry mass of the produced concentrate of curd Q (hereinafter DM3) is largely dependent on the fluctuating dry mass (DM1) of the starting product A and the mass flow of the light whey phase M with an approximately constant dry mass content DM.2

Another factor that can have a certain influence on the setting of the dry matter content is the nozzle equipment of the separator, which is, however, constant during the running process. However, clogging of the nozzles or a reduction of the nozzle diameter can have a certain effect.

Clogging of nozzles can be detected by the method according to the invention, because in such a case the mass flow $\dot{m}3$ of the curd would decrease proportionally to the number of clogged nozzles.

The feed quantity is the only parameter that can be actively influenced during production to affect the DM3 of the curd. The rule of thumb is that a larger feed quantity results in a higher DM of the curd concentrate.

For the adjustment, in particular for the regulation of the dry matter in the curd concentrate, the suitable feed quantity can be calculated based on the mass balance (Formula 1) and accounting for the theoretical throughputs of the nozzles. For this purpose, the difference between the target dry matter DM3, expressed here as $C_{concentrate}$, and the approximately constant dry matter DM2 of the whey, expressed here as $C_{whey}$, is related to the difference between the dry matter DM1 of the starting product used, e.g., skim milk or tank milk, expressed here as $C_{starting\ material}$, and the dry matter DM2 of the whey, which is then multiplied by the nozzle throughput.

This calculation is based on the assumption of knowing the exact nozzle flow rate. Practice has shown that this procedure gives a good initial indicator of the required feed rate, but this usually has to be adjusted after sampling the curd.

$$\dot{m}_{feed} = \dot{m}_{nozzles} * \frac{c_{concentrate} - c_{whey}}{c_{startingproduct} - c_{whey}} \quad \text{(Formula 1)}$$

The method described below and the correspondingly designed device compensate for the uncertainty of the unknown nozzle flow rate by measuring it via the difference between the mass flows of the starting product to the separator and the whey. For this purpose, mass flow meters are used in the feed and discharge of the whey (see FIG. 1). The nozzle discharge is calculated using (Formula 2), taking into account that the measured values should be smoothed for preferably approx. 60 seconds in order to be able to determine a nozzle discharge that is as constant as possible.

$$\dot{m}_{nozzles} = \overline{\dot{m}}_{feed} - \overline{\dot{m}}_{whey} \quad \text{(Formula 2)}$$

The dashes within the formula indicate the smoothing or the averaging over a certain period of time, e.g., 60 seconds. Corresponding designations for the specification of mean values are known in the art.

The exemplary embodiment example shown in FIG. 1 schematically illustrates a device with a nozzle separator 3, preferably with a disc stack (not shown in detail), and with a rotatably mounted bowl (also not shown in detail), which has a bowl volume. The bowl may have a vertical axis of rotation. The separator 3 has a bowl volume. This bowl volume results from the design-related specifications of the separator 3 and at the same time defines a dead time.

The device 10 has a feed line 1 to the nozzle separator 3, along which a regulating element 2 is arranged. A flow meter 9 is also arranged along the feed line 1.

A starting product A, preferably skim milk or curdled tank milk, is fed into the nozzle separator 3, in which the starting product is separated into whey M as a liquid phase and curd Q as a (solid) concentrate. While the whey is discharged from the nozzle separator 3 via the discharge line 4, the concentrate Q is discharged via nozzles through the discharge line 5. The discharge of the concentrate can be continuous. The concentrate Q can then be further processed and cooled, for example.

In the device according to the invention, a flow meter 8, or at least the measuring sensor of a flow meter, is arranged in or along the discharge line 4 of the whey M. The flow rate of the whey M from the nozzle separator 3 can be determined, for example, as a mass flow. The measured values recorded by the flow sensors 8 and 9 and the measured value of the measuring device 6 for determining the dry matter content are transmitted directly via the signal lines 11, 13, 14 to a control and/or evaluation unit 7, where the measured flow value is used as a control variable to determine a manipulated variable S, which is used to adjust the regulating element 2 via a signal line 12 between the control and/or evaluation unit 7 and the regulating element 2.

The adjustment of the dry matter content according to the present method is carried out in such a way that the flow rate, in particular the mass flow rate or mass flow, of whey M in the discharge line 4 of the light phase is determined. In curd production, the light phase is the whey. Due to the separation in the separator, the whey M always has approximately the same dry matter content and can therefore be assumed to be constant.

In addition, the mass flow in the feed line is determined. This also varies with the dry matter content of the starting product. Since the fed starting product may have a dry matter content that varies greatly in some cases, the concentrate will also have a correspondingly varying dry matter content. The operation of the separator and the feed quantity must be adjusted accordingly by the control and/or evaluation unit.

If, for example, a starting product with too little dry matter is fed to the separator 3, the regulating element 2, e.g., a regulating valve, must be opened further so that more dry matter enters the separator and a sufficient amount of concentrate Q is in front of the nozzles of the separator.

By means of a regulated, automatic increase and decrease of the feed capacity of the nozzle separator depending on the flow balance of the fed starting product and the discharged whey, an adjustment to the desired dry matter is made for the curd. A higher feed rate causes an increase in dry matter and vice versa.

Suitable measuring devices, especially for determining the mass flow of the starting product and whey are Coriolis flow meters. It is also possible to use a combination of volumetric flow meter and density meter to determine a mass flow, although these are less preferred.

In addition, a sensor can be arranged in the feed of the starting product A as a measuring sensor of a measuring device 6 for determining the dry matter content of the starting product. Such a sensor can be, for example, a sensor based on a measurement of electromagnetic waves. Corresponding sensors for moisture measurement are, for example, microwave measuring devices, infrared measuring devices, UV-vis measuring devices and the like. In particular, the FT 120 or FT 1 measuring devices from Foss GmbH for liquid products should also be mentioned here. Preferably, the corresponding sensor for the present application is part of an in-line measuring device. The use of an in-line measuring technique for direct determination of the current process conditions enables direct regulation. The requirements for this are ±0.1% measurement accuracy for dry matter. Possible devices for this are the microwave measurement from Berthold and ProFoss.

A measurement of the dry matter especially in the feed milk in combination with the previously described system allows automatic process control for different (concentrated) skim milk batches. Measuring the dry matter of the feed milk also eliminates the dead time until the new concentration is set. This measurement in the feed to the separator is also useful, as the dry matter there may well fluctuate (e.g., due to sedimentation in the tank, tank change, etc.).

FIG. 2 again shows the step sequence of a variant of the method according to the invention for regulating the dry matter content of concentrates in the production of curd cheese, in particular in the production of cottage cheese by means of the device shown in FIG. 1.

In a first step 101, a starting product A is fed to the nozzle separator 3 of the device 10. This is carried out via the feed line 1 shown in FIG. 1.

In this process, the mass flow ṁ1 of the fed starting product A and the dry mass content DM1 of the starting product are determined.

In the nozzle separator 3, in a second step 102, separation takes place into an aqueous light phase, the whey M, and a solid concentrate Q, the curd, which, relative to the whey M, represents the heavy or heavier phase.

In a third step 103, the separated phases M and Q are discharged from the separating device by means of separate discharge lines 4 and 5 measuring the mass flow ṁ2 of the light phase, i.e., whey M.

Based on the determined dry matter content DM1 and depending on the measured mass flow rates ṁ1 and ṁ2, in a fourth step 104 the control and/or evaluation unit 7 adjusts the feed quantity of starting product by generating a control signal S and ultimately thereby also adjusts the dry matter content DM3 in the solids concentrate Q, i.e., the curd.

The measurement is preferably carried out continuously and also preferably with the aid of mass flow meters in each case in the feed line 1 and in a discharge line 4 from the nozzle separator.

The determined dry matter content of the starting product A serves as a controlled variable for setting a suitable mass feed ṁ1 of starting product A as a function of the amount of discharging whey M, whereby an intended dry matter content DM3 in the solids concentrate Q can be set.

From the mass flows of the starting product ṁ1 and the whey ṁ2, the mass flow ṁ3 of curd Q in the discharge line 5 can be calculated, and the dry mass DM3 of the curd can be calculated by means of the determined dry mass DM1 of the starting product A and if the dry mass DM2 of the whey M is known and essentially constant. This determined mass flow ṁ3 in the discharge line 5 can be used as a controlled variable for determining a manipulated variable S for continuous and automatic regulation of the feed quantity of the starting product.

Alternatively, or for redundancy, the dry matter content of the whey can also be measured and used in the determination in step d.

With reference to EP 0 440 208 B1, the present case involves a completely different machine, which has a different separation characteristic.

This process control means that there is no significant dead time and a concentration deviation in the end product is counteracted in advance.

Monitoring of the nozzle wear via the increase in the determined discharge quantity ṁ3 of the nozzles is possible and an indication for a necessary nozzle exchange can be generated.

A reduction in the determined nozzle discharge ṁ3 during production can also be an indicator of a blocked nozzle. Here, for example, a change of $$\Delta \dot{m}_{nozzles} > \frac{1}{12} \overline{\dot{m}_{nozzles}}$$

would be a possible limit value.

Instead of or in addition to the dry mass, the mass of the protein can also be measured inline. The mass balance is also valid for protein, thus the standardization of the concentrate would also be possible for protein.

LIST OF REFERENCE SIGNS

1 Feed line
2 Regulating element
3 Nozzle separator
4 Discharge line (whey)
5 Discharge line (curd)
6 Measuring device (determination of dry matter content)
7 Control and/or evaluation unit
8 Flow meter
9 Flow meter
10 Device
11 Signal line
12 Signal line
13 Signal line
14 Signal line
DM1 Dry matter content of starting product
DM2 Dry matter content of whey
DM3 Dry matter content of curd
ṁ1 Mass flow or flow rate of the starting product
ṁ2 Mass flow or flow rate of the whey fraction
ṁ3 Mass flow or flow rate of the curd fraction
A Starting product
Q Solid concentrate (curd)
M Whey
S Manipulated variable
101 First step (feeding+measuring–starting product)
102 Second step (separation of fractions)
103 Third step (measuring—whey)
104 Fourth step (determination of DM content—curd)

The invention claimed is:

1. A method for adjusting a dry matter content in curd in a device for centrifugally separating a starting product into the curd and whey, wherein the device comprises a nozzle separator, and wherein the method comprises:
 a) feeding the starting product into the nozzle separator of the device via a feed line while determining a content of dry matter or protein of the starting product, and measuring a mass flow of the starting product;
 b) centrifugally separating the starting product by the nozzle separator into a whey fraction and a curd fraction;
 c) separately discharging the whey fraction and the curd fraction from the nozzle separator and measuring a mass flow of the whey fraction discharged from the nozzle separator; and
 d) adjusting the mass flow of the starting product as a function of the determined content of dry matter or protein of the starting product, the measured mass flow of the starting product, and the measured mass flow of the whey fraction,
  wherein a determination of the dry matter content or the protein content of the curd fraction is performed based on the measured mass flow of the starting product, the measured mass flow of the whey fraction discharged from the nozzle separator, and the determined dry matter content or protein content of the starting product.

2. A method for adjusting a dry matter content in curd in a device for centrifugally separating a starting product into the curd and whey, wherein the device comprises a nozzle separator, and wherein the method comprises:
 a) feeding the starting product into the nozzle separator of the device via a feed line while determining a content of dry matter or protein of the starting product, and measuring a mass flow of the starting product;
 b) centrifugally separating the starting product by the nozzle separator into a whey fraction and a curd fraction;

c) separately discharging the whey fraction and the curd fraction from the nozzle separator and measuring a mass flow of the whey fraction discharged from the nozzle separator; and d) adjusting the mass flow of the starting product as a function of the determined content of dry matter or protein of the starting product, the measured mass flow of the starting product, and the measured mass flow of the whey fraction, wherein a determination of the dry matter content or the protein content of the curd fraction is performed based on the measured mass flow of the starting product, the measured mass flow of the whey fraction discharged from the nozzle separator, and the determined dry matter content or protein content of the starting product, the method further comprising determining a mass flow of the curd fraction in a discharge line based on the measured mass flow of the starting product and th measured mass flow of the whey fraction, wherein the mass flows of the starting product introduced into the nozzle separator and of the whey fraction discharged from the nozzle separator are continuously measured, the mass flow of the curd fraction in the discharge line is calculated based on the continuous measurements of the mass flows of the starting product introduced into the nozzle separator and of the whey fraction discharged from the nozzle separator, and wherein the determined mass flow of the curd fraction in the discharge line is used as a value for determining a manipulated variable for automatic and continuous regulation of a feed quantity of the starting product.

3. The method of claim 2, wherein a time difference between the measurement of the content of dry matter or protein of the starting product and the adjustment of the mass flow rate of the starting product is less than 2 min.

4. The method of claim 2, wherein the starting product is continuously fed to the nozzle separator during curd production and the whey and curd fractions are continuously discharged.

5. The method of claim 2, wherein the adjustment of the mass flow of the starting product is based on an assumption of a constant dry matter content of the whey fraction and that the dry matter of the starting product varies.

6. The method of claim 2, wherein a dry matter content of the whey fraction is measured and used for determining the adjustment of the mass flow of the starting product.

7. The method of claim 2, further comprising:
determining a clogging or a degree of clogging of nozzles of the nozzle separator based on the determined mass flow of the curd fraction.

* * * * *